United States Patent
Aurousseau et al.

(10) Patent No.: US 9,273,613 B2
(45) Date of Patent: *Mar. 1, 2016

(54) METHOD AND A DEVICE FOR MONITORING A SERVO-CONTROL LOOP OF AN ACTUATOR SYSTEM FOR ACTUATING VARIABLE-GEOMETRY COMPONENTS OF A TURBOJET

(75) Inventors: Christian Aurousseau, Rubelles (FR); Régis Michel Paul Deldalle, Servon (FR); Xavier Flandrois, Cesson (FR); Jean-Rémi André Masse, Saint Cloud (FR); Aziz Sif, Vigneux sur Seine (FR); Benjamin Pierre Lamoureux, Paris (FR)

(73) Assignee: SNECMA, Paris (FR)

( * ) Notice: Subject to any disclaimer, the term of this patent is extended or adjusted under 35 U.S.C. 154(b) by 449 days.

This patent is subject to a terminal disclaimer.

(21) Appl. No.: 13/880,815

(22) PCT Filed: Oct. 21, 2011

(86) PCT No.: PCT/FR2011/052467
§ 371 (c)(1),
(2), (4) Date: Jul. 1, 2013

(87) PCT Pub. No.: WO2012/052696
PCT Pub. Date: Apr. 26, 2012

(65) Prior Publication Data
US 2013/0338898 A1 Dec. 19, 2013

(30) Foreign Application Priority Data

Oct. 22, 2010 (FR) .................................. 10 58681

(51) Int. Cl.
*G05B 23/02* (2006.01)
*F02C 9/00* (2006.01)

(52) U.S. Cl.
CPC . *F02C 9/00* (2013.01); *G05B 23/02* (2013.01); *G05B 23/0221* (2013.01)

(58) Field of Classification Search
CPC ........ F02C 9/00; G05B 23/0221; G05B 23/02
See application file for complete search history.

(56) References Cited

U.S. PATENT DOCUMENTS 5,806,805 A * 9/1998 Elbert ..................... B64C 13/42
244/195
8,831,855 B2 * 9/2014 Masse ................ G05B 23/0221
60/772

(Continued)

FOREIGN PATENT DOCUMENTS

FR 2 939 170 6/2010

OTHER PUBLICATIONS

International Search Report Issued Dec. 21, 2011 in PCT/FR11/52467 Filed Oct. 21, 2011.

*Primary Examiner* — Helal A Algahaim
*Assistant Examiner* — Donald J Wallace
(74) *Attorney, Agent, or Firm* — Oblon, McClelland, Maier & Neustadt, L.L.P.

(57) ABSTRACT

A method monitoring a servo-control loop, including: estimating monitoring parameters from operating data of the servo-control loop; obtaining indicators from the monitoring parameters; determining at least one signature from values of at least some of the indicators; and detecting and locating a degradation affecting the servo-control loop as a function of the at least one determined signature.

14 Claims, 6 Drawing Sheets

(56) References Cited

U.S. PATENT DOCUMENTS

2008/0221835 A1* 9/2008 Volponi ............. G05B 23/0278 702/185
2008/0243291 A1 10/2008 Lee et al.
2011/0288836 A1 11/2011 Lacaille et al.
2012/0101706 A1 4/2012 Masse et al.

* cited by examiner

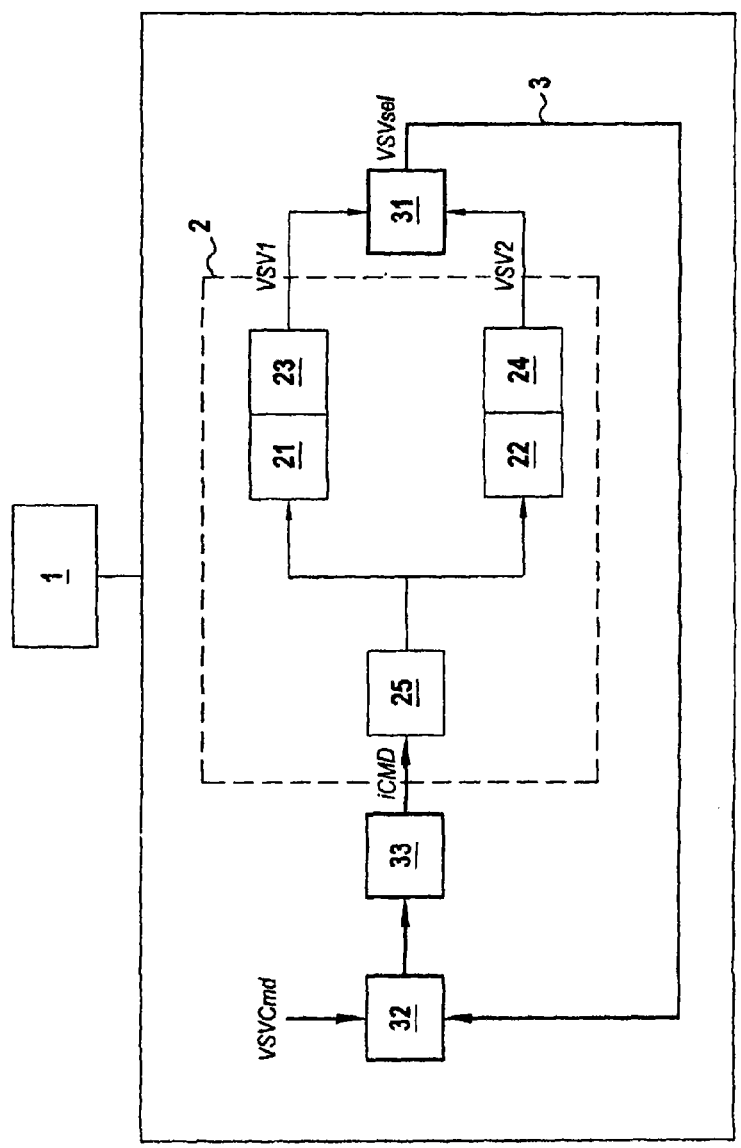
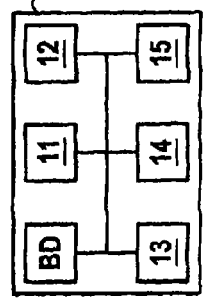

METHOD AND A DEVICE FOR MONITORING A SERVO-CONTROL LOOP OF AN ACTUATOR SYSTEM FOR ACTUATING VARIABLE-GEOMETRY COMPONENTS OF A TURBOJET

BACKGROUND OF THE INVENTION

The present invention relates to the general field of aviation.

More particularly, the invention relates to monitoring a servo-control loop of an actuator system for actuating variable-geometry components of a turbojet fitted to an aircraft.

The term "variable-geometry components" is used herein to mean components of equipment other than the rotary members of the engine and that present dimensions, shapes, and/or positions and/or speeds that can be modified as a function of detected events or as a function of engine speeds. Examples of "variable-geometry components" include pitch angles of variable-pitch stator vanes (VSVs) of compressors, variable bleed valves (VBVs) of the compressor, turbine blade tip clearances, and the positions of a fuel metering unit.

In traditional manner, these variable dimensions, shapes, or positions are varied by hydraulic actuator systems that use fuel is their actuating fluid. These actuator systems are controlled by the electronic regulator module or electronic control unit (ECU) of the full authority digital engine control (FADEC) of the aircraft so as to adapt the variable geometries to the flight scenario (or mission) of the aircraft. Control is performed by means of servo control loops.

Thus, it can readily be understood that it is crucial to monitor the actuator systems of variable-geometry components in order to ensure that a turbojet is available and efficient.

Degradations to such actuator systems lead, in particular, to components of the turbojet taking up positions and/or sizes that do not comply with the commands from the ECU under steady conditions, or to said components responding slowly to such commands under transient conditions. Such degradations are early signs of failure. In general, they are initially compensated by the servo-control loops of the actuator systems or else they are without any significant consequence other than a reconfiguration of the actuator systems (e.g. changing the active control channel).

Nevertheless, after a certain amount of time, when such degradations persist and get worse, they are no longer compensated and can make the turbojet inefficient or inoperative. The ECU regulation system can then issue a failure message.

Thus, it can be understood that such deteriorations are detected too late when they are detected only as a result of the actuator system breaking down.

There thus exists a need to have a method of effectively monitoring the servo-control loops of the actuator systems for actuating variable-geometry components of a turbojet, in particular in order to be able to issue a maintenance notice for such actuator systems before the turbojet is made inoperative or inefficient, while taking care to minimize the number of useless or untimely maintenance operations that are performed.

By way of example, document FR 2 939 924 and presently unpublished document FR 10/58681 describe techniques of detecting failures in an aeroengine, the techniques involving estimating a plurality of indicators.

The document "Hydraulic actuation loop degradation diagnosis and prognosis", by E. Diez-Lledó, J. Aguila-Margin, J-R. Massé, A. Sif, and E. Griful, 1st CEAS European Air and Space conference, 2007, describes the use of diagnosis and prognosis techniques applied to monitoring servo-control loops of systems for actuating variable-pitch stator vanes.

OBJECT AND SUMMARY OF THE INVENTION

An object of the present invention is to satisfy this need in particular by proposing a monitoring method for monitoring a servo-control loop of an actuator system for actuating variable-geometry components of a turbojet fitted to an aircraft, the actuator system comprising a servovalve controlling first and second actuators. In accordance with the invention, the monitoring method comprises:

an estimation step of estimating a plurality of monitoring parameters from operating data of the servo-control loop, the monitoring parameters being selected from at least one of the following parameter categories:
  a category of parameters representative of positions of the actuators;
  a category of parameters representative of speeds of the actuators;
  a category of parameters representative of coefficients of autoregressive models used for predicting actuator positions as a function of a control current of the servovalve; and
  a category of parameters representative of the control current of the servovalve or an integral current of the servo-control loop;
an obtaining step of obtaining a plurality of indicators from the monitoring parameters;
a determination step of determining at least one signature from the values of at least some of the indicators; and
a detection and location step of detecting and locating a degradation affecting the servo-control loop as a function of said at least one determined signature.

Correspondingly, the invention also provides a device for monitoring a servo-control loop of an actuator system for actuating variable-geometry components of a turbojet fitted to an aircraft, the actuator system comprising a servovalve controlling first and second actuators. In accordance with the invention, the monitoring device comprises:

estimator means for estimating a plurality of monitoring parameters from operating data of the servo-control loop, said monitoring parameters being selected from at least one of the following parameter categories:
  a category of parameters representative of positions of the actuators;
  a category of parameters representative of speeds of the actuators;
  a category of parameters representative of coefficients of autoregressive models used for predicting actuator positions as a function of a control current of the servovalve; and
  a category of parameters representative of the control current of the servovalve or an integral current of the servo-control loop;
obtaining means for obtaining a plurality of indicators from the monitoring parameters;
determination means for determining at least one signature from the values of at least some of the indicators; and
detection and location means for detecting and locating a degradation affecting the servo-control loop as a function of said at least one determined signature.

The invention thus proposes a method and a device for monitoring a servo-control loop of a system for actuating variable-geometry components of a turbojet, which method and device are reliable. By way of example, such an actuator system is a system for actuating variable-geometry components selected from:

pitch angles of variable-pitch compressor stator vanes;
a fuel flow rate;
clearances at the blade tips of a high-pressure or low-pressure turbine; and
positions of a bleed valve for a turbojet compressor.

In the meaning of the invention, it should be observed that a degradation affecting the servo-control loop may refer equally well to any type of fault or deterioration affecting said servo-control loop. Properly speaking, degradations are early signs of a breakdown, i.e. if they persist and get worse, they can have the consequence of making the turbojet inoperative or inefficient.

Advantageously, the invention serves not only to predict breakdowns that might affect the servo-control loop, but also to predict their locations (e.g. in the controller, in the servo-control loop, in the system for acquiring the commands as actually applied, etc.), in particular by using signatures (or symptoms) that are representative of the operation of the servo-control loop over a predetermined time period.

A targeted preventative maintenance notice relating to the actuator system may thus possibly be generated, serving firstly to anticipate a failure of the turbojet and secondly to take action that is targeted on the actuator system.

Thus, by improving the monitoring of the actuator system, the invention makes it possible to avoid overabundant and useless maintenance of the turbojet while guaranteeing that it is available and efficient. Thus, the availability and the efficiency of the turbojet are improved while reducing maintenance costs and fuel costs.

In an implementation of the invention, at least one of the parameters is estimated from an autoregressive model depending on at least one exogenous variable selected from:

air pressure of a combustion chamber of the turbojet;
metered fuel flow rate through at least one injector of the combustion chamber of the turbojet; and
speed of rotation of a high-pressure shaft of the turbojet.

Having recourse to an autoregressive model makes it possible to implement predictive monitoring of the actuator system, i.e. not only to diagnose failures of the actuator system, but also to predict how they are going to vary over time and during the lifetime of the turbojet. This characteristic can thus encourage enlightened maintenance of the turbojet, as a function of the severity of any failure.

In addition, the autoregressive model(s) for estimating parameters may be corrected as a function of environmental conditions of the turbojet. Thus, in order to be able to benefit from the advantages of the method of the invention, it is not necessary to ensure that conditions are unchanging (i.e. iso-conditions) in terms of air pressure in the turbojet combustion chamber, fuel flow rate as metered into the injector(s) of the combustion chamber, and/or speed of rotation of the high-pressure shaft of the turbojet.

On the contrary, the invention makes it possible advantageously to adapt the dynamics of the autoregressive model(s) under consideration as a function for example:

of the fuel flow rate delivered by the fuel pump, which flow rate is a function of the speed of rotation of the high-pressure shaft of the turbojet;
of air resistance on the linkage (kinematic), which is a function of the air pressure in the combustion chamber of the turbojet; and/or
of the flow rate available for the actuator system, which itself is a function of the fuel flow rate metered into the injectors of the combustion chamber of the turbojet.

As a result, the autoregressive models used for estimating the parameters are more precise and it becomes possible to avoid false alarms due to coefficients varying or to the autoregressive models varying as a result of a change in such environmental conditions.

The category of parameters representative of positions of the actuators may comprise, for example, at least one of the following parameters:

a parameter representative of a measured instantaneous position of the first actuator;
a parameter representative of a measured instantaneous position of the second actuator;
a parameter representative of a predicted position of the first actuator;
a parameter representative of a predicted position of the second actuator; and
a parameter representative of a predicted overall actuator position.

Preferably, in this implementation, the plurality of indicators comprises:

an indicator i_EVS representing the normalized mean square difference between the parameter representative of the predicted overall actuator position and an instantaneous overall position of the actuators;
an indicator i_EVA representing the normalized mean square difference between the parameter representative of a measured instantaneous position of the first actuator and the parameter representative of a predicted position of the first actuator;
an indicator i_EVB representing the normalized mean square difference between the parameter representative of a measured instantaneous position of the second actuator and the parameter representative of a predicted position of the second actuator;
an indicator i_CID determined as a function of a parameter representative of the mean control current of the servo-valve, as normalized by a parameter (m14) representative of a reference control current; and
an indicator i_CINT determined as a function of a parameter representative of the mean integral current of the servo-control loop, normalized by a parameter representative of a reference integral current.

Said indicators contribute to providing monitoring that is reliable and that serves considerably to reduce false alarms relating to detecting mechanical type degradations of the actuator system and predicting breakdowns.

In the meaning of the invention, the term "mechanical type degradations of the actuator system" should be understood as meaning that a mechanical item of the actuator system is degraded (e.g. due to wear of a mechanical part such as the torque motor).

In particular, the above-mentioned indicators make it possible to detect mechanical type degradations of the actuator system reliably, e.g. an offset of the control current of one of the actuators, a blockage of the cooling diaphragm of one of the actuators, internal wear of the cylinder of one of the actuators that might lead to an increase in the internal leakage rate therein.

In an implementation, the positions of the first and second actuators, respectively, are measured by position sensors comprising secondary windings, the root mean square (rms) voltages across the secondary windings depending on the positions of the actuators, with the plurality of indicators comprising:

an indicator i_EPA representative of a prediction error for the position of the first actuator;

an indicator i_EPB representative of a prediction error for the position of the second actuator;

an indicator i_SOMA determined as a function of a parameter representing a mean value of the sum of the rms voltages of the secondary windings of the position sensor of the first actuator, normalized by a parameter representative of a reference mean position for the first actuator;

an indicator i_SOMB determined as a function of a parameter representing a mean value of the sum of the rms voltages of the secondary windings of the position sensor of the second actuator, normalized by a parameter representative of a reference mean position for the second actuator; and an indicator i_EWRAP representative of the mean difference existing between the control current of the servovalve and a measured return control current.

Said indicators contribute to providing monitoring that is reliable. They lead to a considerable reduction in false alarms concerning the detection of "electrical" type degradations of the actuator system, e.g. intermittent contacts in the actuator control systems, or intermittent contacts in the actuator measurement systems, as well as the prediction of breakdowns.

In addition, these indicators make it easier to identify and locate degraded components in the servo-control loop: actuator, servovalve, hydromechanical unit (HMU) containing the servovalve, electric cables (also referred to as harnesses) conveying the control currents or the position indications, etc.

In another implementation of the invention:

the estimating and obtaining steps of estimating monitoring parameters and of obtaining indicators are performed for each mission in a plurality of successive missions of the aircraft;

during the estimation step, a monitoring parameter is estimated that is representative of the control current of the servovalve of the actuator system and at least one monitoring parameter representative of an actuator speed of the actuator system;

during the obtaining step, the indicators are obtained by analyzing variations of said at least one monitoring parameter representative of an actuator speed as a function of the monitoring parameter representative of a control current;

during the determination step, said at least one signature is determined from the indicators obtained over a plurality of successive missions of the aircraft and is representative of the variation of these indicators during the missions; and the detection step includes a comparison step of comparing said at least one signature with at least one reference signature associated with at least one predetermined degradation that might affect the servocontrol loop.

Correspondingly, in this implementation of the invention, the monitoring device is remarkable in that:

the estimator means estimating monitoring parameters and the obtaining means for obtaining indicators are activated for each mission of a plurality of successive missions of the aircraft;

the estimator means are suitable for estimating a monitoring parameter representative of a control current of the servovalve of the actuator system and at least one monitoring parameter representative of an actuator speed of the actuator system;

the obtaining means are suitable for obtaining the indicators by analyzing variations of said at least one monitoring parameter representative of an actuator speed as a function of the monitoring parameter representative of a control current;

the determination means determining said at least one signature are suitable for determining said at least one signature from indicators obtained over a plurality of successive missions of the aircraft, said at least one signature being representative of the variation of the indicators over the missions; and the detection means comprise means for comparing said at least one signature with at least one reference signature associated with at least one predetermined degradation that might affect the servocontrol loop.

In this implementation, attention is paid preferentially to detecting degradations of "mechanical" type. By way of example, in a servo control loop of an actuator system for controlling pitch angle variation of variable stator vanes (VSVs), such a mechanical degradation may be drift in the rest current of a servovalve in the actuator system (due to wear of the mechanical parts of the actuator system, such as in particular the torque motor), or to a leak taking place between the chambers of an actuator of the system (also known as an inter-chamber leak).

Advantageously, the invention proposes predictive monitoring of the actuator system based on tracking preferred indicators over time (i.e. over several successive missions of the aircraft), which indicators are constructed from operating data of the servo control loop as measured during those missions.

In accordance with the invention, these preferred indicators are obtained by analyzing variations in at least one parameter, referred to as a "monitoring" parameter, that is representative of an actuator speed of the actuator system as a function of a monitoring parameter representative of a control current of the servovalve of the actuator system. The values of these monitoring parameters are estimated from operating data measured during successive missions under consideration.

It should be observed that the term "monitoring parameter" representative of an actuator speed of the actuator system is used to cover any type of parameter equivalent to an actuator speed. Thus, it may be the speed of a particular actuator of the actuator system, or when the actuator system has a plurality of actuators, a speed derived from the overall position as estimated from valid channels of the actuator system.

The inventors have observed, most advantageously, that studying these monitoring parameters and the indicators that result therefrom makes it possible not only to detect mechanical degradations affecting the servocontrol loop, but also to distinguish degradations between one another, i.e. to identify the elements to which they relate, in other words to locate them (servovalve or actuator(s), and where appropriate, which actuator(s)). The invention is thus particularly remarkable in that it proposes reliable monitoring of the servo control loop of the actuator system based on sensors that are already present in the aircraft.

For this purpose, the invention makes use in particular of a comparison between at least one signature representative of the variation over time of indicators obtained from these parameters with reference signatures associated with predetermined degradations.

Preferably in this implementation of the invention, at least one indicator that is obtained corresponds to a characteristic of at least one curve modeling the variations of said at least one parameter representative of an actuator speed as a function of the parameter representative of a control current of the servovalve.

In the meaning of the invention, the term "characteristic" of a curve designates any element suitable for characterizing all or part of the curve, such as for example a particular point of the curve or its abscissa value or its ordinate value, a slope of a portion of the curve, etc.

Such indicators have the advantage of being relatively insensitive to the environmental conditions in which the operating data is measured. In order to benefit from the advantages of the method of the invention with these indicators, there is therefore no need to require conditions that are constant (i.e. iso-conditions), in particular in terms of: air pressure in the combustion chamber of the turbojet; fuel flow rate meters into the injector(s) of the combustion chamber; and/or the speed of rotation of the high-pressure shaft of the turbojet; nor is there any need to normalize these indicators relative to such environmental conditions.

Furthermore, the monitoring proposed by the invention on the basis of these indicators is advantageously robust against external forces applied on one and/or another of the actuators (e.g. a radial or an axial load applied on the rod of one or the actuators).

In a preferred variant implementation, the following indicators are obtained:
 a rest or equilibrium current of the servocontrol loop: this current corresponds to the control current of the servovalve when the actuator speed(s) is/are zero; and
 the abscissa value and the ordinate value of at least one point of the curve for which a change of slope is observed on either side of the point.

These indicators are associated with the location of the equilibrium point of the torque motor of the servovalve, i.e. the portion of the servovalve that transforms the control current (in other words electrical power) into actuator movement (in other words mechanical power) by an electromagnetic effect. Tracking the location of this equilibrium point (and thus of the indicators) over successive missions of the aircraft makes it possible to identify whether the characteristics of the servo loop have changed, and where appropriate to determine that the actuator system has departed from its nominal state.

The invention thus makes it possible to monitor the servo-control loop in relatively simple manner, in that it is based on only a relatively limited number of indicators. In addition, the above-mentioned indicators contribute to reliable monitoring of the servocontrol loop and they make it possible to reduce false alarms considerably in terms of falsely detecting mechanical degradations of the actuator system and falsely forecasting failures.

In another implementation of the invention, there is also obtained as an indicator at least one slope coefficient of a line obtained by linear regression on the points used for forming said curve.

Obtaining such indicators makes it possible to increase the reliability of the monitoring performed in accordance with the invention.

In other implementations, it is also possible to envisage the monitoring method and device of the invention presenting some or all of the above-mentioned characteristics in combination.

In a particular implementation, the various steps of the monitoring method are determined by computer program instructions.

Consequently, the invention also provides a computer program on a data medium, the program being suitable for being implemented in a monitoring device, or more generally in a computer, the program including instructions adapted to implementing steps of a monitoring method as described above.

The program may use any programming language and may be in the form of source code, object code, or code intermediate between source code and object code, such as in a partially compiled form, or in any other desirable form.

The invention also provides a computer-readable data medium that includes computer program instructions as specified above.

The data medium may be any entity or device capable of storing the program. For example, the medium may comprise storage means, such as a read-only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, or it may be conveyed via an electrical or optical cable or by radio or by other means. The program of the invention may in particular be downloaded from a network of the Internet type.

Alternatively, the data medium may be an integrated circuit having the program incorporated therein, the circuit being adapted to execute or to be used in the execution of the method in question.

BRIEF DESCRIPTION OF THE DRAWINGS

Other characteristics and advantages of the present invention appear from the following description given with reference to the accompanying drawings that show an implementation having no limiting character. In the figures:

FIG. 1 shows a device for monitoring a servo-control loop in a system of the invention for actuating variable-geometry components in a particular embodiment of the invention;

FIG. 2 is a diagram showing the hardware architecture of the FIG. 1 monitoring device, in a particular embodiment of the invention.

DETAILED DESCRIPTION OF THE INVENTION

Figure 3:
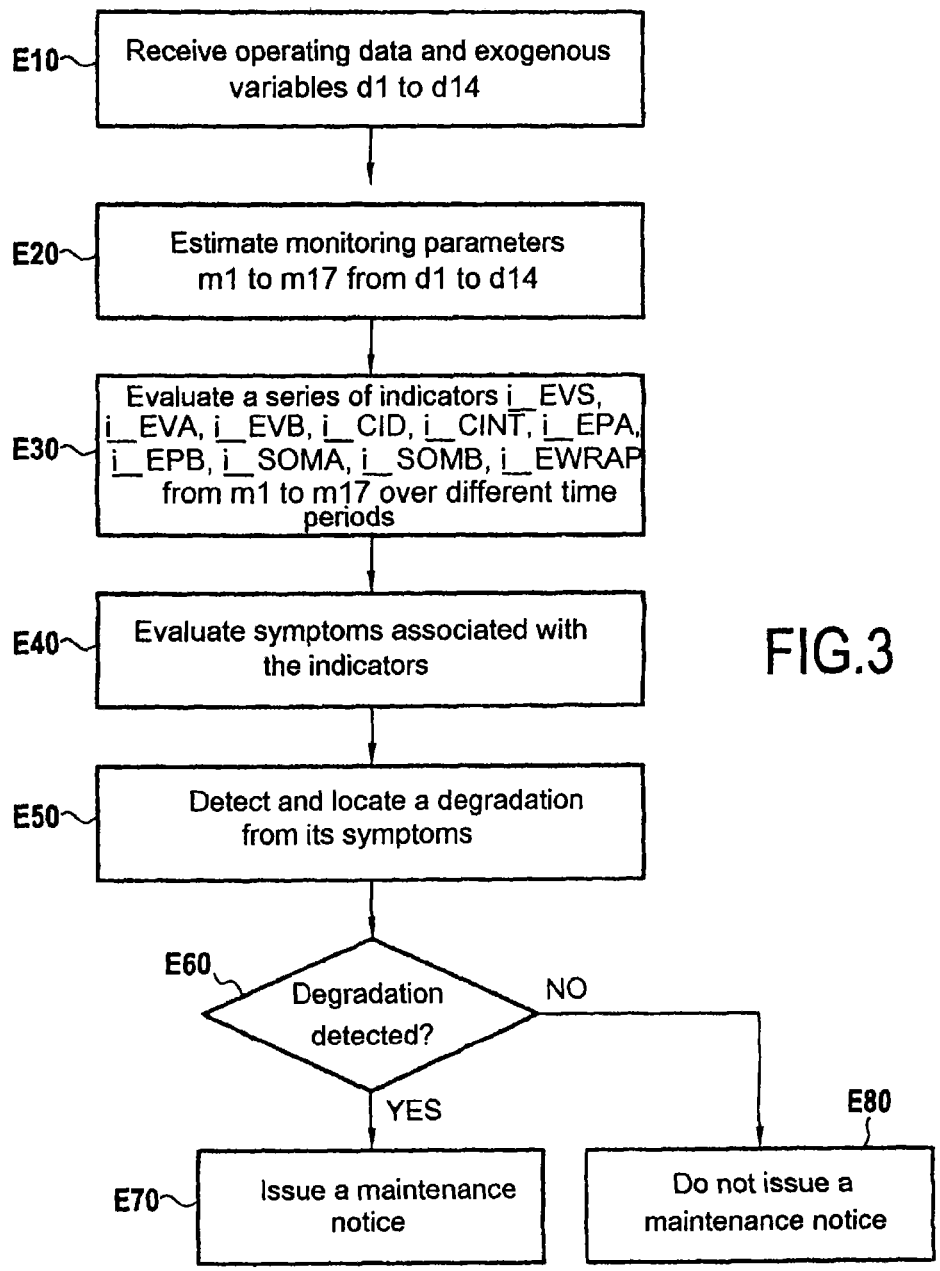
FIG. 3 is a flow chart showing the main steps of a monitoring method in accordance with the invention when implemented by the monitoring device of FIG. 1 in accordance with a first implementation of the invention.

As described above, the invention relates to monitoring servo-control loops in a system for actuating variable-geometry components of a turbojet fitted to an aircraft.

In the examples described herein, attention is given to monitoring a servo-control loop of an actuator system controlling variation in the pitch angles of VSVs (Variable Stator Vanes) of a turbojet.

Nevertheless, this assumption is not limiting in any way. The invention is equally applicable to other systems for actuating variable-geometry components, as described below.

FIG. 1 shows a particular embodiment of a monitoring device 1 in accordance with the invention in its environment. The monitoring device 1 in this example is adapted to monitor a VSV actuator system 2 in a turbojet fitted to an aircraft (not shown), the actuator system 2 being controlled by a servo-control loop 3, or "control loop". Such a VSV actuator system and such a servo-control loop are known per se and are described only briefly herein.

In the example described herein, the actuator system 2 has two redundant actuators 21 and 22 that are mechanically secured to each other.

Each actuator is associated with a position sensor (respectively referenced 23 and 24), such as, for example, a linear variable displacement transducer (LVDT) placed in the actuator. In known manner, such an LVDT sensor is constituted:
- by a primary winding, powered with alternating current (AC);
- by a magnetic slider; and
- by two secondary windings, referenced EA and EB.

It should be observed that the position of the magnetic slider has an influence on the rms voltages at the terminals of the secondary windings, written Vi_EA and Vi_EB, where i=23 and 24 depending on the sensor under consideration. The position is proportional to the following quantity:

$$\frac{Vi\_EA - Vi\_EB}{Vi\_EA + Vi\_EB}.$$

The positions of the actuators 21 and 22 are controlled by a servovalve 25, itself controlled by the servo-control loop 3. More precisely, the servovalve 25 adapts the hydraulic power delivered to the actuators 21 and 22 as a function of an electrical control current iCMD that it receives from the servo-control loop 3.

The positions of the actuators 21 and 22 as measured respectively by the sensors 23 and 24 and written VSV1 and VSV2 are delivered to a selector unit 31 of the servo-control loop 3.

The selector unit 31 is adapted to estimate an instantaneous overall position VSVsel, that it evaluates on basis of the positions VSV1 and VSV2.

For example, the validities of the positions VSV1 and VSV2 are determined, and VSVsel is equal to the mean of the measured positions VSV1 and VSV2 if they are both valid, or to one or the other of the measured positions VSV1 and VSV2 if only one of the positions is valid. More precisely, VSVsel=VSV1 if VSV1 is valid and VSV2 is invalid, and VSVsel=VSV2 if VSV2 is valid and VSV1 is invalid.

In known manner, the servo-control loop 3 further includes a control unit 32. This control unit 32 is adapted to compare the instantaneous overall position VSVsel as delivered by the selection unit 31 with a so-called "control" position VSVCmd representative of a position in which the actuators ought to be found in compliance with the turbojet regulation relationships implemented by the ECU via the servo-control loop 3 (VSVCmd is an actuator position that is taken into account for determining control of the servo-control loop 3 in the meaning of the invention).

A digital signal representing the position difference between VSVsel and VSVCmd is then transmitted by the control unit 32 to a regulator unit 33 for regulating the servo-control loop 3, which regulator unit is of the proportional integral (PI) corrector type. In known manner, the regulator unit 33 is adapted to transform the digital comparison signal it receives into an electric control current iCMD and to transmit said current to the servovalve 25.

The servovalve 25 then controls the position of the actuators 21 and 22 by transforming the electric control current into hydraulic power, as described above.

In the presently-envisaged example, the monitoring device 1 is incorporated in the ECU computer of the full authority digital engine control (FADEC) device of the aircraft, and the servocontrol loop 3 that includes the units 31, 32, and 33 is provided by a computer program executed by the monitoring device 1. The units 31, 32, and 33 shown in FIG. 1 thus designate functional entities, even if they are shown in parallel with structural elements of the actuator system 2.

In a variant embodiment, the monitoring device 1 is on board an aircraft, in a data concentrator, which takes charge of the maintenance algorithms of the aircraft.

In another variant embodiment, the monitoring device 1 is included in a system on the ground.

The monitoring device 1 in this example has the hardware architecture of a computer, as shown in FIG. 2.

It comprises in particular a processor 11, a random access memory (RAM) 12, a ROM 13, and means 14 for communicating with equipments on board the aircraft, such as for example, with the FADEC of the aircraft or with the components of the actuator system 2 and the servo-control loop 3. In known manner, such pieces of equipment and the monitoring device 1 of the invention communicate with one another via digital data buses or lines that are fitted to the aircraft and known to the person skilled in the art.

The monitoring device 1 also includes communications means 15 for communicating with a server of the aircraft operator (not shown). By way of example, these means comprise a network card for communicating over the Internet.

The ROM 13 includes a computer program in accordance with the invention adapted to execute the main steps of the monitoring method of the invention, described below with reference to two particular implementations of the invention.

First Particular Implementation

FIG. 3 shows the main steps of the monitoring method of the invention when implemented by the monitoring device of FIG. 1 in accordance with a first implementation of the invention.

According to this first implementation, the monitoring method comprises:
- an estimation step of estimating a plurality of monitoring parameters from operating data of the servo-control loop;
- an evaluation step of evaluating a plurality of indicators from the monitoring parameters;
- an evaluation step for evaluating at least one signature matrix, each signature matrix being representative of the values of at least some of the indicators; and
- a detection and location step of detecting and locating a degradation affecting the servo-control loop as a function of said at least one signature matrix.

Furthermore, during the estimation step, an estimate is made of a plurality of parameters selected from at least one of the following categories:
- a category of parameters representative of positions of the actuators;
- a category of parameters representative of coefficients of autoregressive models used for predicting actuator positions as a function of a control current of the servovalve; and a category of parameters representative of the control current of the servovalve or an integral current of the servo-control loop.

In accordance with the invention in the first implementation, monitoring of the servo-control loop 3 of the VSV actuator system 2 is implemented via various data sets, including operating data of the servo-control loop, monitoring parameters, indicators, and signatures (or symptoms). With reference to FIG. 3, there follows a description of these data sets and the way in which they are used relative to one another in order to monitor the servo-control loop 3.

The term "operating data" when applied to the servo-control loop covers various kinds of data needed for the operation of the VSV actuator system, and more particularly the servo-control loop, and/or representative of its operation.

In the example described herein, consideration is given to the following operating data:
the active channel control current iCMD delivered to the servovalve 25 by the regulator unit 33 (written below d4);
the measured position VSV1 of the first actuator 21 (written below d5);
the measured position VSV2 of the second actuator 22 (written below d6);
the instantaneous overall position VSVsel of the actuators, as delivered by the selector unit 31 (written below d7);
the difference $\epsilon$ between the control position VSVCmd and the overall position VSVsel (written below d8);
the sum of the rms voltages (V23_EA and V23_EB) across the secondary windings of the sensor LVDT 23 of the first actuator (written below d9);
the sum of the rms voltages (V24_EA and V24_EB) across the secondary windings of the sensor LVDT 24 of the second actuator (written below d10);
the return current (or "warp") as actually measured by the channel A of the ECU (written below di1);
the return current (or "warp") as actually measured by the channel B of the ECU (written below d12);
an active channel index IVA (written below d13); and
the integral current of the servo-control loop (written below d14), as calculated by the regulator unit 33. It should be observed that the integral current serves to correct imperfections of the servo-control loop 3. Making use of the integral current in a servo-control loop, in addition to the proportional current, is known to the person skilled in the art and is not described further herein.

This operating data is available from the FADEC that has the monitoring device 1 incorporated therein, as mentioned above. It may be derived from measurements taken using sensors fitted to the turbojet and themselves known, such as for example the data d5 and d6, or accessible via the ECU, such as for example d7, d13, or d14.

In the example described here, consideration is also given to so-called "exogenous" data selected from:
the air pressure PS3 in the combustion chamber of the turbojet (written below d3);
the fuel flow WFM metered out into at least one injector of the combustion chamber of the turbojet (written below d2); and
the speed of rotation N2 of the high-pressure shaft of the turbojet (written below d1).

These variables are not inherent to the actuator system and to its servo-control loop properly speaking, which is why they are referred to as being "exogenous", however they have an influence on their behaviors. For example, the speed of rotation of the pump that pumps the fuel that serves as the hydraulic fluid for actuating the actuators is proportional to the speed of rotation N2 of the high-pressure shaft of the turbojet. Similarly, the fuel flow rate WFM as metered out into the injectors of the turbojet combustion chamber has an influence on the flow rate that is available for the hydraulic actuator system. Finally, the air pressure PS3 in the turbojet combustion chamber has an influence on the stress applied to the system by the linkage actuated by the actuators.

These exogenous variables are known to the person skilled in the art and are conventionally measured in the turbojet by means of suitable sensors (e.g. flow meter for WFM). Like the operating data, measurements of these exogenous variables are available to the FADEC.

The above-mentioned operating data and the measurements of the exogenous variables are transmitted by the FADEC to the monitoring device 1 for estimating the monitoring parameters of the servo-control loop 3 (step E10).

It should be observed that this data may be transmitted to the monitoring device progressively as it is acquired, or in a variant after a predetermined time period (e.g. when the turbojet is stopped, or periodically while it is in operation).

In the first embodiment described herein, consideration is given to monitoring the servo-control loop 3 by means of a plurality of parameters selected from at least one of the following parameter categories:
a category CAT1 of parameters representative of a position of the actuators 21 and 22.
a category CAT2 of parameters representative of coefficients of autoregressive models used for predicting an actuator position in operation as a function of the control current iCMD of the servovalve 25; and
a category CAT3 of parameters representative of the servovalve control current iCMD or the integral current of the servo-control loop 3.

More precisely, in the example described herein, all of the following parameters are estimated over one or more (K) predetermined time periods written TP1, TP2, . . . , TPK (step E20):

In the Category CAT1:
a parameter written m1, representative of the measured instantaneous position VSV1 of the actuator 21 (first actuator in the meaning of the invention), over the time period TPk under consideration (k=1, . . . , K). This parameter is obtained directly from the data d5. In other words, the components of the vector m1 are equal to the data d5 over the time period TPk;
a parameter written m2, representative of the measured instantaneous position VSV2 of the actuator 22 (second actuator in the meaning of the invention), over the time period TPk under consideration (k=1, . . . , K). This parameter is obtained directly from the data d6. In other words, the components of the vector m2 are equal to the data d6 over the time period TPk;
a parameter written m3, representative of a prediction of the position VSVsel, over the time period TPk and as made with the help of a first autoregressive prediction model written ARX1. The autoregressive model ARX1 under consideration is described below;
a parameter written m8, representative of a so-called "reference" mean value for the sum of the rms voltages (VA23_EA and V23_EB) across the secondary windings of the actuator 21 over a predefined reference or training time period written TP0. The parameter m8 is obtained by evaluating the mean over said reference period of type d9 reference data derived from measurements performed on a plurality of turbojets of the same type or belonging to the same fleet as the turbojet fitted with the actuator system 2;

a parameter written m9, representative of a mean value of the sum of the rms values (V23_EA and V23_EB) across the secondary windings of the actuator 21 over the time period TPk under consideration. The parameter m9 is obtained by evaluating the mean of the data d9 over the time period TPk;

a parameter written m10, representative of a so-called "reference" mean value of the sum of the rms voltages (VA24_EA and V24_EB) across the secondary windings of the actuator 22 over the reference or training time period TP0. The parameter m10 is obtained by evaluating the mean over this time period of the reference data of type d10 as derived from measurements performed on a plurality of turbojets of the same type as or belonging to the same fleet as the turbojet fitted with the actuator system 2; and a parameter written m11, representative of a mean value of the sum of the rms values (V24_EA and V24_EB) across the secondary windings of the actuator 22 over the time period TPk under consideration. The parameter m11 is obtained by evaluating the mean of the data d10 over the time period TPk.

In the Category CAT2:

a parameter written m4, representative of the coefficients of the above-mentioned first autoregressive model ARX1 used for predicting a position VSVsel (parameter m3). The parameter m4 is evaluated over a reference observation window WO of size N, on the basis of reference data of type d7 derived from measurements performed on a plurality of turbojets of the same type as or belonging to the same fleet as the turbojet fitted with the actuator system 2;

a parameter written m5, representative of an overall position of the actuators 21 and 22 as predicted by a second autoregressive model, written ARX2, as a function of the control current iCMD of the servovalve 25;

a parameter written m6, representative of the position of the actuator 21 as predicted by a third autoregressive model, written ARX3, as a function of the control current iCMD of the servovalve 25; and a parameter written m7, representative of the position of the actuator 22 as predicted by a fourth autoregressive model, written ARX4, as a function of the control current iCMD of the servovalve 25.

The autoregressive models ARX1-ARX4 and the way in which coefficients are obtained from these models are described in detail below. It should be observed that the parameters in the category CAT2 in this example are vectors of sizes determined by the numbers of coefficients taken into consideration in the models ARX1-ARX4.

In the Category CAT3:

a parameter written m12, representative of the mean difference that exists between the control current iCMD of the servovalve 25 and the return current as actually measured for the channel A of the ECU if said channel is active. The parameter m12 is equal to the mean over the time period TPk of the data (d4-d11);

a parameter written m13, representative of the mean difference that exists between the control current iCMD of the servovalve 25 and the return current as actually measured for the channel B of the ECU if said channel is active. The parameter m13 is equal to the mean over the time period TPk of the data (d4-d12);

a parameter written m14, representative of a mean reference control current. The parameter m14 is evaluated over the reference period TP0 from the type d4 reference data derived from measurements performed on a plurality of turbojets of the same type as or belonging to the same fleet as the turbojet fitted with the actuator system 2;

a parameter written m15, representative of the mean control current of the servovalve 25. The parameter m15 is equal to the mean over the time period TPk of the data d4;

a parameter written m16, representative of a mean reference integral current of the servo-control loop 3. The parameter m16 is evaluated over the reference period TP0 on the basis of type d14 reference data derived from measurements on a plurality of turbojets of the same type as or belonging to the same fleet as the turbojet fitted with the actuator system 2; and a parameter written m17, representative of the mean integral current of the servo-control loop 3. The parameter m17 is equal to the mean over the time period TPk of the data d14.

It should be observed that the above-mentioned parameters are original parameters involved in monitoring the servo-control loop 3. They are preferably all taken into consideration. Nevertheless, in a variant, it is possible to take only a subset of these parameters into consideration, in application of a compromise that needs to be evaluated between performance and complexity.

These monitoring parameters are estimated from the operating data d4 to d14 and from the exogenous variables d1 to d3, as sampled over the time periods TPk (k=1, ..., K) under consideration.

Preferably, a time period TPk is selected during steady conditions while cruising or while idling on the ground. The inventors have observed that during such steady conditions, the symptoms are the most marked, thereby improving detection of degradations affecting the servo-control loop, and ensuring that detection is more reliable.

There follows a brief description of the autoregressive models used for estimating the parameters m4-m7. It is assumed here that use is made of linear models of the autoregressive model with external inputs (ARX) type, as are well known to the person skilled in the art. In a variant, other autoregressive models could be used, such as for example, models of the autoregressive moving average with exogenous variables (ARMAX) type.

In known manner, an ARX model is an autoregressive model defining an output y(t) as a function of one or more inputs and a random modeling residue characterized by zero average white noise η(t), where t designates the sampling instant under consideration.

Advantageously, in the example described herein, the ARX models ARX1-ARX4 have as their inputs the variable d4 representative of the control current iCMD for the servovalve 25 and the exogenous variables d1 to d3 (or in equivalent manner, N2, WFM, and PS3).

Thus, in more precise manner:

the models ARX1 and ARX2 under consideration have the form:

$$y(t) = d7(t) = \sum_{j=1}^{jd7} a_j d7(t-j) + \sum_{j=1}^{jd1} b_j d1(t-j) +$$
$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

the model ARX4 has the form:

$$y(t) = d6(t) = \sum_{j=1}^{jd6} a_j d6(t-j) + \sum_{j=1}^{jd1} b_j d1(t-j) +$$

$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

the model ARX3 has the form:

$$y(t) = d5(t) = \sum_{j=1}^{jd5} a_j d5(t-j) + \sum_{j=1}^{jd1} b_j d1(t-j) +$$

$$\sum_{j=1}^{jd2} c_j d2(t-j) + \sum_{j=1}^{jd3} e_{ji} d3(t-j) + \sum_{j=1}^{jd4} f_j d4(t-j) + \eta(t)$$

where the elements $a_j$, $b_j$, $c_j$, $e_j$, and $f_j$ designate the coefficients of the ARX models (it should be observed that these coefficients are not necessarily identical for the various models, however for reasons of simplification, only one notation is used). The quantities jd1, jd2, jd3, jd4, jd5, jd6, and jd7 designate the numbers of coefficients for each input and output of the ARX models.

In general, if y(t) designates the output from an ARX model (selected from ARX1-ARX4), and if θ is the vector of size J of the coefficients of the ARX model (J=jd1+jd2+jd3+jd5+jd6), e.g. for y(t)=d6(t), the vector θ may be estimated using conventional methods known to the person skilled in the art over an estimation time window of predefined size N.

Thus, if h(t) designates the vector of size J comprising the observations of the input variables of the ARX model under consideration as various instants (earlier than or equal to t), and possibly observations of y at instants earlier than t, then it is possible to write:

$$y(t) = h(t)\theta + \eta(t)$$

$$y(t-1) = h(t-1)\theta + \eta(t-1)$$

$$\ldots$$

$$y(t-T+1) = h(t-T+1)\theta + \eta(t-T+1)$$

that is equivalent in matrix form to searching for θ such that:

$$Y(t) = H(t)\theta + N(t) \quad \text{(Eq. 1)}$$

with:

$$Y(t) = \begin{pmatrix} y(t) \\ y(t-1) \\ \vdots \\ y(t-T+1) \end{pmatrix}$$

-continued $$H(t) = \begin{pmatrix} h(t) \\ h(t-1) \\ \vdots \\ h(t-T+1) \end{pmatrix}$$

$$N(t) = \begin{pmatrix} \eta(t) \\ \eta(t-1) \\ \vdots \\ \eta(t-T+1) \end{pmatrix}$$

Solving equation (1) serves to obtain an estimate of the vector θ. This estimate defines:

in the above-mentioned reference estimation window W0, the parameter m4 when the ARX model under consideration in equation (1) is the model ARX1; this estimate also makes it possible to evaluate the parameter m3 by using equation (1); and in the above-mentioned estimation window W:
the parameter m5 when the ARX model under consideration in equation (1) is the model ARX2;
the parameter m6 when the ARX model under consideration in equation (1) is the model ARX3; and
the parameter m7 when the ARX model under consideration in equation (1) is the model ARX4.

The set of parameters m1 to m17 estimated in this way during step E20 is then used to evaluate a series of indicators (step E30) over each time period TPk under consideration.

More precisely, in the example described herein, ten indicators are evaluated from the parameters m1 to m17 over the time periods TP1, . . . , TPK. These ten indicators are as follows:

The indicator i_EVS represents the normalized mean square difference between m5 and d7.

More precisely, the sum S_EVS of the differences (m5-d7)$^2$ is calculated for each time period TP1, . . . , TPK. Thereafter, the indicator i_EVS is calculated by normalizing the sum S_EVS by having recourse to a statistical distribution to which it is subjected, having a reference mean m0 and a reference standard deviation σ0: i_EVS=(S_EVS−m0)/σ0.

The above-mentioned statistical distribution may for example be determined during a calibration stage by observing the sum S_EVS over a predefined training time period. The inventors have found that this distribution presents a normal relationship, thus enabling the above-mentioned normalization to be performed. The other indicators described below are normalized in corresponding manner.

In similar manner, the indicator i_EVA represents the normalized mean square difference between the parameters m1 and m6, the indicator i_EVB represents the normalized mean square difference between the parameters m2 and m7. The indicator i_CID represents the parameter m15 normalized by the parameter m14.

The indicator i_CINT represents the parameter m17 normalized by the parameter m16.

The indicator i_EPA represents the error in the prediction of the position of the actuator 21. It is given by the difference between the measured position, as represented by the parameter m1, and the position m3 as predicted by the model having its coefficients given by the parameter m4.

The indicator i_EPB represents the error in the prediction of the position of the actuator 22. It is given by the difference between the measured position as represented by the parameter m2 and the position m3 as predicted by the model having its coefficients given by the parameter m4.

The indicator i_SOMA represents the parameter m9 normalized by the parameter m8.

The indicator i_SOMB represents the parameter m11 normalized by the parameter m10.

The indicator i_EWRAP is equal to the parameter m12 or to the parameter m13, depending on which channel is active (given by d13).

The set of indicators i_EVS, i_EVA, i_EVB, i_CID, and i_CINT serve to detect mechanical type degradations of the actuator system 2, e.g. an offset of the control current for the actuator 21 or 22, a blockage of the cooling diaphragm of the actuator 21 or 22, internal wear in the cylinder of the actuator 21 or 22 possibly giving rise to an increase in the internal leakage rate thereof.

More precisely, the values of the indicators i_EVS, i_EVA, i_EVB, i_CID, and i_CINT form a matrix, also referred to as a signature matrix, enabling degradation to be detected and located. Several techniques are known to the person skilled in the art for enabling a signature matrix to be associated with a particular degradation. For example, the technique described in document FR 2 939 924 may be used, and under such circumstances, the indicators i_EVS, i_EVA, i_EVB, i_CID, and i_CINT constitute indicators that are standardized in the meaning of that document.

The inventors have observed that the above-mentioned indicators enable mechanical type degradations to be detected in effective and reliable manner. Nevertheless, the invention may also involve the use of other indicators.

In corresponding manner, the set of indicators i_EPA, i_EPB, i_SOMA, i_SOMB, and i_EWRAP serve to detect electrical type degradations of the actuator system 2, e.g. intermittent contacts in the control system for the actuators 21 and 22 via channel A or channel B, and intermittent contacts in the measurement system of the actuator 21 or 22.

More precisely, the values of the indicators i_EPA, i_EPB, i_SOMA, i_SOMB, and i_EWRAP form a matrix, also referred to as a signature matrix, serving to detect and locate such degradations. Several techniques known to the person skilled in the art enable a signature matrix to be associated with a particular degradation. For example, the technique described in document FR 2 939 924 may be used, and under such circumstances, the indicators i_EPA, i_EPB, i_SOMA, i_SOMB, and i_EWRAP constitute indicators that are standardized in the meaning of that document.

The inventors have found that the above-mentioned indicators enable electrical type degradations to be detected in effective and reliable manner. Nevertheless, the invention may also involve the use of other indicators.

Thus, in step E50, the monitoring device 1 may detect degradation relating to the servo-control loop 3 on the basis of symptoms (signatures).

In step E60, the monitoring device 1 verifies whether a degradation was detected during step E50.

If a degradation has been detected, then it issues a maintenance notice identifying the degradation and its location (step E70), and recommending maintenance on the servo-control loop (e.g. replacing a component in the actuator system as a function of the detected degradation).

This notice may be sent subsequently to the operator of the aircraft using the communications means 15 of the monitoring device 1.

In contrast, if no degradation is detected, no maintenance notice is issued (step E80) and monitoring continues.

In the first implementation described herein, attention is given to monitoring the servo-control loop of a VSV actuator system. As mentioned above, the invention in accordance with this first implementation also applies to other systems for actuating variable-geometry components such as, for example, actuator systems controlling:

the positions of bleed valves in a turbojet compressor, such as the systems for actuating VBVs and transient bleed valves (TBVs);

a fuel flow rate, such as systems for actuating a flow modulation valve (FMV); and clearances at the blade tips of a high-pressure or a low-pressure turbine, such as systems for actuating high-pressure turbine active clearance control (HPTACC) or low-pressure turbine active clearance control (LPTACC).

In addition, for such other actuator systems, other parameters, and/or indicators, and/or symptoms, and/or signatures may be envisaged.

For example, for a servo-control loop in a fuel metering system (FMV), consideration may be given to an additional indicator constituted by the difference between a flow rate that has been ordered and a flow rate that is measured.

For a servo-control loop of an actuator system for positioning air pressure VBVs, consideration may be given to an additional indicator constituted by the difference between the position ordered and the position reached. This additional indicator could also be taken into consideration for a servo-control loop of a system for actuating the blade tip clearances of a high-pressure or low-pressure turbine, such as the HPTACC or LPTACC actuator systems.

With reference to FIGS. 4 to 8, there follows a description of a second particular implementation of the invention.

Figure 4:
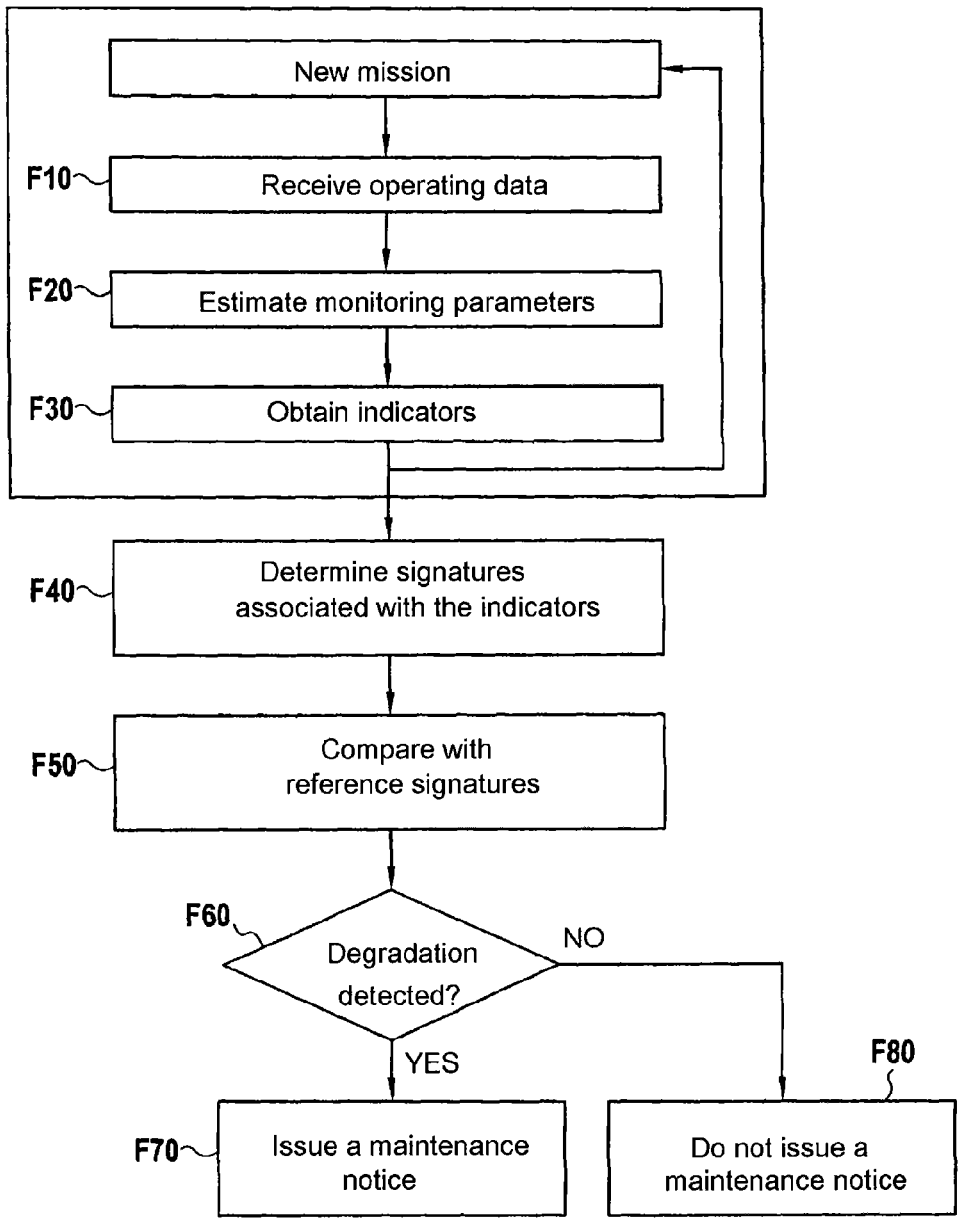
FIG. 4 is a flow chart showing the main steps of a monitoring method in accordance with the invention when implemented by the monitoring device of FIG. 1 in accordance with a second implementation of the invention.

Second Particular Implementation:

FIG. 4 shows the main steps of the monitoring method in accordance with the invention when implemented by the monitoring device of FIG. 1 in accordance with a second implementation.

In the second implementation, the monitoring method comprises:

for each mission in a plurality of successive missions of the aircraft:

an estimation step using operating data of the servocontrol loop during the mission to estimate a monitoring parameter representative of a control current of the servovalve of the actuator system and at least one monitoring parameter representative of an actuator speed of the actuator system; and an obtaining step of obtaining indicators by analyzing variations in said at least one monitoring parameter representative of an actuator speed as a function of the monitoring parameter representative of a control current;

a determination step using indicators obtained on the plurality of successive missions of the aircraft to determine signatures representative of variation in the indicators during missions; and a comparison step of comparing the signatures with reference signatures associated with at least one predetermined degradation that might affect the servocontrol loop.

In the example described herein, attention is given to monitoring the servocontrol loop of an actuator system controlling variation in the pitch angles of VSVs of a turbojet.

Nevertheless, this assumption is not limiting in any way. The invention in this second implementation is equally applicable to other systems for actuating variable-geometry components such as, for example, actuator systems controlling the positions of the valves in a compressor of the turbojet, such as variable bleed valve (VBV) actuator systems.

In addition, in the example of FIG. 1, the actuator system has a servovalve controlling two actuators that are mechanically united. Nevertheless, it should be observed that the invention in this second implementation is equally applicable to an actuator system having only one actuator or having two actuators that are not mechanically united.

In accordance with the invention in this second implementation, the servocontrol loop 3 of the VSV actuator system 2 is performed over a plurality of missions of the aircraft, via various data sets including operating data of the servocontrol loop, monitoring parameters, indicators, and signatures. With reference to FIG. 4, there follows a description of these data sets and the way in which they are used relative to one another in order to monitor the servocontrol loop 3.

The term "operating data", when applied to the servocontrol loop, covers various kinds of data needed for the operation of the VSV actuator system, and more particularly the servocontrol loop, and/or representative of its operation.

In the example described herein, consideration is given to the following operating data:
  the active channel control current iCMD delivered to the servovalve 25 by the regulator unit 33; and
  the instantaneous overall position VSVsel of the actuators as delivered by the selection unit 31.

For each mission, this operating data is available at a predetermined sampling frequency fe (e.g. fe=8 kHz) from the FADEC that incorporates the monitoring device 1, as mentioned above. The data may be derived from measurements taken using conventional sensors fitted to the turbojet or accessible via the ECU computer (as applies for example to the instantaneous overall position VSVsel).

For each mission of the aircraft, the above-mentioned operating data is transmitted as a whole to the monitoring device 1 in order to estimate the monitoring parameters of the servocontrol loop 3 relating to that mission (step F10). It should be observed that the data may be transmitted to the monitoring device progressively as it is acquired, or in a variant, after some predetermined period of time (e.g. when the turbojet is turned off at the end of a mission, or periodically while it is in operation).

Furthermore, in the second implementation described herein, all of the operating data collected during a mission is transmitted to the monitoring device. In a variant, it may be possible to be content with transmitting only data that is recorded at suitably chosen predetermined instants.

In the presently described second implementation, the servocontrol loop 3 is monitored using two monitoring parameters (step F20), namely:
  a monitoring parameter m1' representative of the control current of the servovalve 25 of the actuator system 2, obtained directly from the corresponding operating data iCMD; and
  a monitoring parameter m2' representative of an actuator speed of the actuator system 2, obtained from the operating data VSVsel.

More precisely, in the presently described example, the parameters m2' representative of the actuator speed at the instant kTe, where Te designates the sampling period of the operating data (i.e. Te=1/fe), is given approximately by the following equation:

$$m2'(kTe) = \frac{VSVsel(kTe) - VSVsel((k-1)Te)}{Te}$$

where VSVsel (kTe) designates the value of VSVsel at the instant kTe.

The parameters m1' and m2' as estimated in this way during the step F20 for each mission of the aircraft are subsequently used to evaluate a series of indicators for that mission (step F30).

In the presently-described second implementation, attention is given to three indicators i1, i2, i3, obtained by analyzing a curve C for the mission under consideration that models variations in the monitoring parameter m2' as a function of the monitoring parameter m1'. This curve C is obtained from points M(kTe) having the abscissa values m1'(kTe) and the ordinate values m2'(kTe) that were evaluated during step F20.

Figure 5:
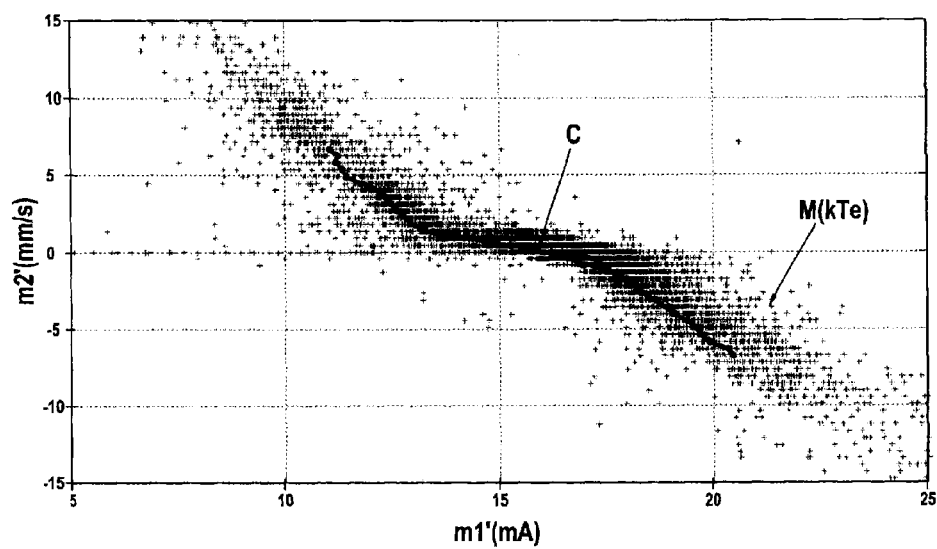
FIG. 5 shows an example of a curve C modeling the variations in a speed of an actuator as a function of the control current of the servovalve for a mission of the airplane, in the second implementation.

An example of such a curve is given in FIG. 5.

More particularly, in the example of FIG. 5, because of the low measurement resolution of the position sensors 23 and 24, the parameter m2' also presents rather poor resolution. For each value of the parameter m2', the curve C is obtained by averaging the abscissa values m1' of the points M that have the values m2' as their ordinate values.

In addition, in the example of FIG. 5, the curve C makes use of only a limited number of speed values (i.e. values of m2'), namely 15 positive values and 15 negative values.

The points MC(l), for l=1, ..., N (with N=30 in FIG. 5) of the curve C as obtained in this way are then stored in a file F that is stored in the permanent memory 13 of the monitoring device 1.

In the presently described implementation, the indicators i1, i2, and i3 correspond to particular characteristics of the curve C, namely:
  i1 corresponds to the rest or equilibrium current of the servocontrol loop, i.e. when the actuator speed is zero (no movement of the actuators); and
  i2 and i3 correspond respectively to the abscissa value and to the ordinate value of a particular point of the curve situated beyond the equilibrium point of the servocontrol loop at which the actuator speed is zero (i.e. an abscissa value greater than the abscissa value of the equilibrium point), and for which a change of slope is observed on either side of the point in question.

Figure 6A:
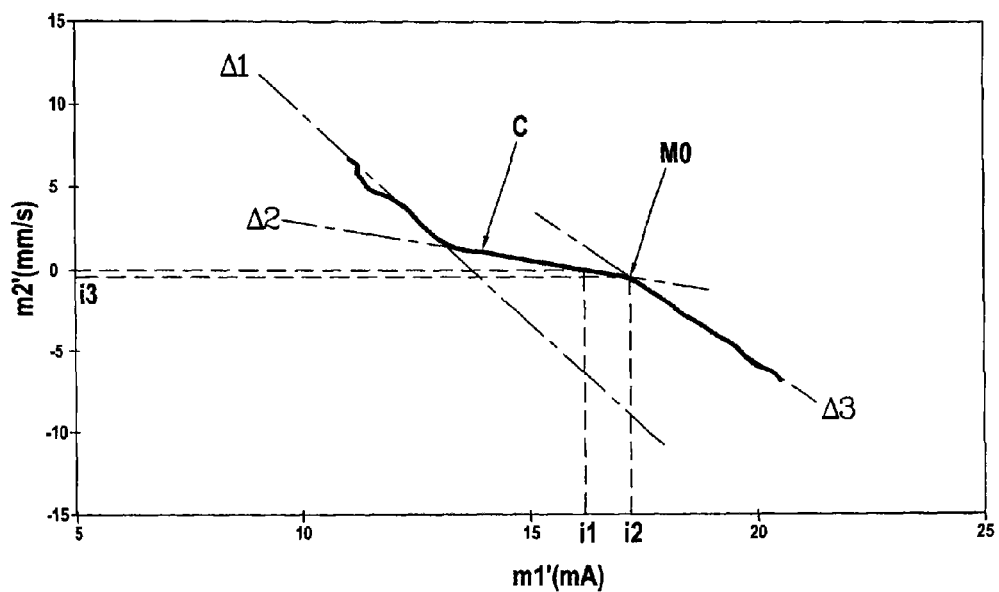
FIGS. 6A and 6B show some indicators that can be extracted from the curve C of FIG. 5, in two particular implementation variants.

FIG. 6A shows the indicators i1, i2, and i3 obtained from the curve C shown in FIG. 5.

In the presently described implementation, these indicators are extracted automatically by the monitoring device 1, from the points of the curve C stored in the file F.

More particularly for i1, the monitoring device 1 searches in the file F for a point MC(l) having a zero ordinate value m2'. The indicator i1 is given by the abscissa value of this point. If there is no point of zero ordinate value present in the file F, then the monitoring device 1 evaluates i1 by interpolation from the abscissa values of two consecutive points MC(l) and MC(l+1) having respective positive and negative ordinate values.

For i2 and i3, the monitoring device 1 begins by in evaluating for each consecutive pair of points MC(l) and MC(l+1) of the curve C, the relative difference between their abscissa values. It then calculates the mean m and the standard deviation a of the differences as evaluated in this way, in conventional manner. A difference between two consecutive points MC(l) and MC(l+1) of the curve C that is greater than m+2×σ informs the monitoring device 1 that the slope-change point M0 has been reached. The monitoring device 1 deduces the indicators i2 and i3 from the coordinates of the point M0=MC(l) stored in the file F.

In a variant, the indicators i1, i2, and i3 may be extracted by an operator from a graphical display of the curve C and may be supplied to the monitoring device 1, e.g. by input/output means of the monitoring device 1 (not shown) or via the communications means 15.

In the presently described second implementation for monitoring the servocontrol loop 3, only the three above-described indicators are envisaged i1, i2, and i3. Nevertheless, this assumption is not limiting, and other indicators could be extracted from the curve C in addition to the indicators i1, i2, and i3, such as for example:

- indicators i4 and i5 corresponding respectively to the abscissa and the ordinate values of some other point M0' of the curve C at which a change of slope is observed. This point is situated ahead of the equilibrium point of the servocontrol loop at which the actuator speed is zero (i.e. it has an abscissa value less than that of the equilibrium point). In order to determine the indicators i4 and i5, the monitoring device 1 looks for a difference between two consecutive points MC(l) and MC(l+1) of the curve C less than m+2×σ. The monitoring device 1 deduces the indicators i4 and i5 of the coordinates of the point M0'=MC(l) stored in the file F;
- an indicator i6 corresponding to the rest current of the torque motor of the servovalve 25: this indicator corresponds to the abscissa value of the middle point of the segment [M0M0'];
- an indicator i7 corresponding to the slope coefficient of a line Δ1 obtained by linear regression on the points of the curve C situated upstream from the point M0' (i.e. having abscissa values less than the abscissa value of M0');
- an indicator i8 corresponding to the slope coefficient of a line Δ2 obtained by linear regression on the points of the curve C situated between the points M0' and M0 (i.e. of abscissa values lying between the abscissa values of the points M0' and M0); and
- an indicator i9 corresponding to the slope coefficient of a line Δ3 obtained by linear regression on the points of the curve C situated downstream from the point M0 (i.e. of abscissa values greater than the abscissa value of M0).

The means enabling to obtain the indicators i7 to i9 are known to the person skilled in the art and are not further described herein.

Figure 6B:
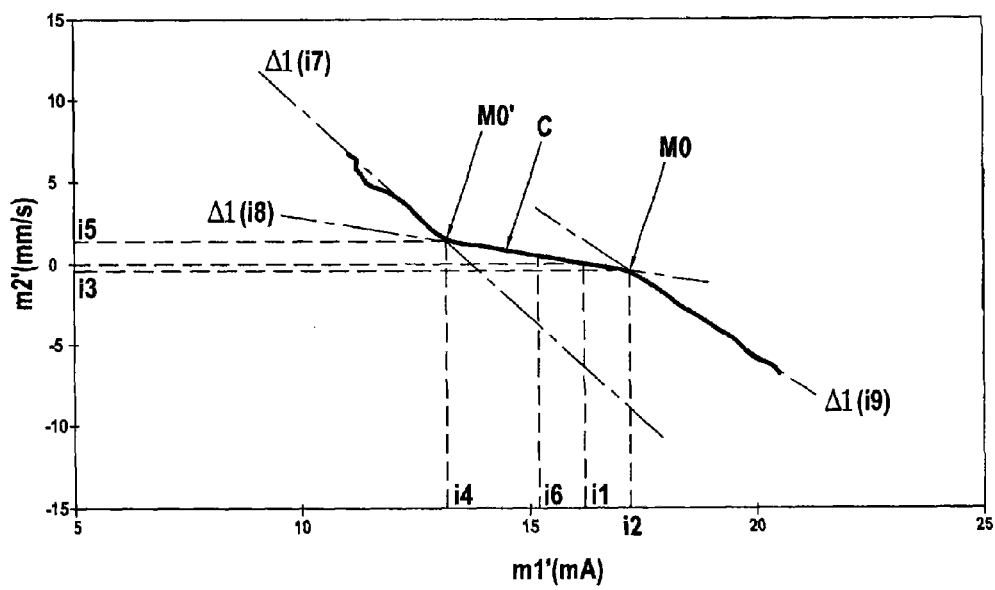

The indicators i4 to i9 extracted from the curve C shown in FIG. 5 are illustrated in FIG. 6B.

The set of indicators i1, i2, and i3 obtained in step F30 for the various missions of the aircraft is then used in order to detect mechanical type degradations of the actuator system 2.

More precisely, in the presently described second implementation, the values of the indicators i1, i2, and i3 as obtained for the various missions of the aircraft are initially aggregated in order to form a signature representative of the operation of the servocontrol loop (step F40).

For example, this signature is a vector made up of components that are the values of the indicators i1, i2, and i3 obtained for the various missions of the aircraft. The indicators i1, i2, and i3 may be normalized if necessary before determining the corresponding signature.

In a variant, it is possible to determine a plurality of signatures, each signature being associated with a particular indicator.

Thereafter, the signature is compared with reference signatures, each reference signature being associated with a predetermined degradation and comprising the values of the indicators i1, i2, and i3 in the presence of that degradation (step F50). The reference signature associated with a particular degradation reflects the values of the indicators beyond which it is considered that the degradation is present, i.e. typically the values of the indicators for which the actuator system is no longer functional or for which a failure word is issued.

Several techniques known to the person skilled in the art make it possible to associate a reference signature with a particular degradation. For example, the reference signatures may be determined from criteria established by experts, in compliance with caricature behaviors of the indicators in the event of degradation.

Figure 7:
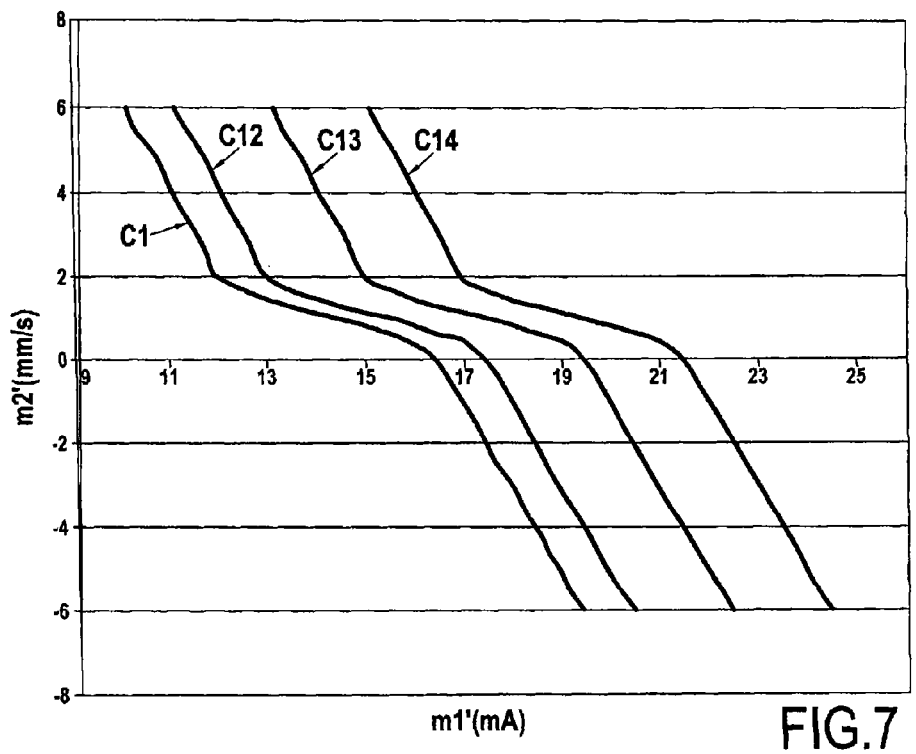
FIG. 7 shows the behavior of the curve C of FIG. 5 in the presence of drift in the rest current of the servovalve.
Figure 8:
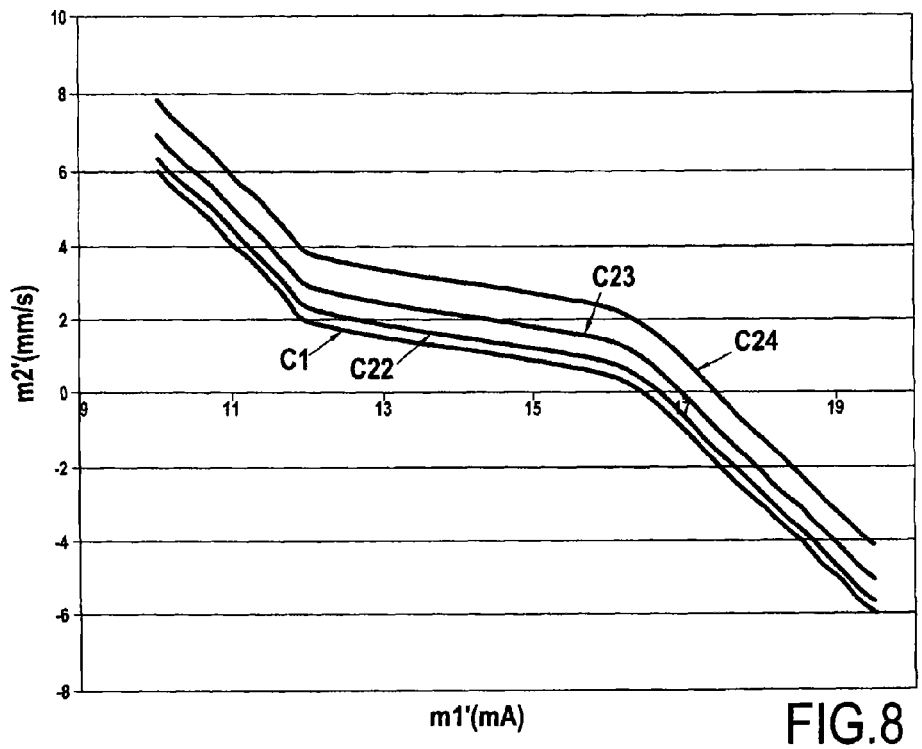
FIG. 8 shows the behavior of the curve C of FIG. 5 in the presence of an internal leak in an actuator of the actuator system.

FIGS. 7 and 8 show such behaviors, respectively:
- in the presence of drift in the rest current of the servovalve 25 of the actuator system 2; and
- in the presence of a leak occurring between the chambers of an actuator 21 or 22 of the actuator system 2.

More precisely, in FIG. 7:
- the curve C1 shows variations in actuator speed as a function of control current and in the absence of degradation; and
- the curves C12, C13, and C14 show variations in actuator speed as a function of control current in the presence of the following respective rest current drifts: +1 milliamp (mA); +3 mA; and +5 mA.

In other words, any increase in the drift of the rest current of the servovalve gives rise to a horizontal shift towards the right of the curve that models variations in actuator speed as a function of control current.

In similar manner, on FIG. 8:
- the curve C1 illustrates variations in actuator speed as a function of control current and in the absence of degradation; and
- the curves C22, C23, and C24 represent variations in actuator speed as a function of control current in the presence of the following respective internal leaks in an actuator: 1 bar; 4 bars; and 7 bars.

In other words, an application of the internal leak in an actuator gives rise to an upward vertical shift of the curve modeling the variations in the speed of the actuator as a function of control current.

The comparison step properly speaking between the signature(s) associated with the indicators i1, i2, and i3 may be performed using various techniques that are known to the person skilled in the art. For example, it is possible to use the method described in document FR 2 939 924 in which the anomaly vector and the reference vectors correspond respectively to the signature and to the reference signatures of the invention.

This comparison makes it possible to detect whether a particular failure associated with a reference signature is affecting the servocontrol loop 3.

In step F60, the monitoring device 1 verifies whether a degradation was detected during step F50.

If a degradation has been detected, then it issues a maintenance notice identifying the degradation and its location (step F70), and recommending maintenance on the servo-control loop (e.g. replacing a component in the actuator system as a function of the detected degradation).

This notice may be sent subsequently to the operator of the aircraft using the communications means 15 of the monitoring device 1.

In contrast, if no degradation is detected, no maintenance notice is issued (step F80) and monitoring continues.

In the implementation described herein, attention is given to monitoring the servo-control loop of a VSV actuator system. As mentioned above, the invention also applies to other actuator systems. In addition, for such other actuator systems, other parameters, and/or indicators, and/or symptoms, and/or signatures may be envisaged.

Furthermore, in the presently described implementation, the two actuators of the actuator system are mechanically secured to each other: they are thus moved at the same speed, which is why the instantaneous overall position VSVsel is taken into account for detecting and locating a potential degradation.

In a variant, in another implementation, when the two actuators 21, 22 of the actuator system 2 are not mechanically secured to each other, it may be appropriate to extract indicators (e.g. the indicators i1, i2, and i3) both from a curve modeling variations in the speed of the actuator 21 (obtained from the positions VSV1 of the actuator 21 as measured by the sensor 23) as a function of the control current iCMD, and also from a curve modeling the variations in the speed of the actuator 22 (obtained from the positions VSV2 of the actuator 22 as measured by the sensor 24) as a function of the control current iCMD. As a result, it is possible to detect a degradation that affects the actuators 21 and 22 and by using one or more appropriate reference signatures to determine which actuator is affected by the degradation.

Furthermore, monitoring the positions VSV1 and VSV2 can advantageously make it possible to detect a degradation that affects the position sensors 23 and 24: during nominal operation, these two sensors ought to deliver measurements that are similar.

The invention claimed is:

1. A monitoring method of monitoring a servo-control loop of an actuator system for actuating variable-geometry components of a turbojet fitted to an aircraft, the actuator system including a servovalve controlling first and second actuators, the method comprising:
    estimating a plurality of monitoring parameters from operating data of the servo-control loop, the monitoring parameters being selected from at least one of the following parameter categories:
        a category of parameters representative of positions of the actuators;
        a category of parameters representative of speeds of the actuators;
        a category of parameters representative of coefficients of autoregressive models used for predicting actuator positions as a function of a control current of the servovalve; and
        a category of parameters representative of the control current of the servovalve or an integral current of the servo-control loop;
    obtaining a plurality of indicators from the monitoring parameters;
    determining at least one signature from values of at least some of the indicators;
    detecting and locating a degradation affecting the servo-control loop as a function of the at least one determined signature; and issuing a maintenance notice in response to detection of the degradation.

2. A monitoring method according to claim 1, wherein at least one of the parameters is estimated from an autoregressive model depending on at least one exogenous variable selected from:
    air pressure of a combustion chamber of the turbojet;
    metered fuel flow rate through at least one injector of the combustion chamber of the turbojet; and
    speed of rotation of a high-pressure shaft of the turbojet.

3. A monitoring method according to claim 1, wherein the category of parameters representative of positions of the actuators comprises at least one of the following parameters:
    a parameter representative of a measured instantaneous position of the first actuator;
    a parameter representative of a measured instantaneous position of the second actuator;
    a parameter representative of a predicted position of the first actuator;
    a parameter representative of a predicted position of the second actuator; and
    a parameter representative of a predicted overall actuator position.

4. A monitoring method according to claim 3, wherein the plurality of indicators comprises:
    an indicator representing the normalized mean square difference between the parameter representative of the predicted overall actuator position and an instantaneous overall position of the actuators;
    an indicator representing the normalized mean square difference between the parameter representative of a measured instantaneous position of the first actuator and the parameter representative of a predicted position of the first actuator;
    an indicator representing the normalized mean square difference between the parameter representative of a measured instantaneous position of the second actuator and the parameter representative of a predicted position of the second actuator;
    an indicator determined as a function of a parameter representative of the mean control current of the servovalve, as normalized by a parameter determined as a function of a reference control current; and
    an indicator determined as a function of a parameter representative of the mean integral current of the servo-control loop, normalized by a parameter representative of a reference integral current.

5. A monitoring method according to claim 3, wherein the positions of the first and second actuators, respectively, are measured by position sensors comprising secondary windings, rms voltages across the secondary windings depending on the positions of the actuators, with the plurality of indicators comprising:
    an indicator representative of a prediction error for the position of the first actuator;
    an indicator representative of a prediction error for the position of the second actuator;
    an indicator determined as a function of a parameter representing a mean value of the sum of the rms voltages of the secondary windings of the position sensor of the first actuator, normalized by a parameter representative of a reference mean position for the first actuator;
    an indicator determined as a function of a parameter representing a mean value of the sum of the rms voltages of the secondary windings of the position sensor of the second actuator, normalized by a parameter representative of a reference mean position for the second actuator; and
    an indicator representative of the mean difference existing between the control current of the servovalve and a return current as actually measured.

6. A monitoring method according to claim 1, wherein:
    the estimating and obtaining of estimating monitoring parameters and of obtaining indicators are performed for each mission in a plurality of successive missions of the aircraft;
    during the estimation, a monitoring parameter is estimated that is representative of the control current of the servovalve of the actuator system and at least one monitoring parameter representative of an actuator speed of the actuator system;

during the obtaining, the indicators are obtained by analyzing variations of the at least one monitoring parameter representative of an actuator speed as a function of the monitoring parameter representative of a control current;

during the determination, the at least one signature is determined from the indicators obtained over a plurality of successive missions of the aircraft and is representative of the variation of these indicators during the missions; and the detection includes comparing the at least one signature with at least one reference signature associated with at least one predetermined degradation that might affect the servocontrol loop.

7. A monitoring method according to claim 6, wherein at least one indicator that is obtained corresponds to a characteristic of at least one curve modeling variations of the at least one monitoring parameter representative of an actuator speed as a function of the monitoring parameter representative of a control current of the servovalve.

8. A monitoring method according to claim 7, wherein the following indicators are obtained:

a rest current of the servo-control loop; and the abscissa value and the ordinate value of at least one point of the curve for which a change of slope is observed on either side of the point.

9. A monitoring method according to claim 8, further obtaining as an indicator at least one slope coefficient of a line obtained by linear regression on the points used for forming the curve.

10. A monitoring method according to claim 8, wherein the at least one degradation is electrical drift of a rest current of the servovalve and/or an inter-chamber leak in an actuator of the actuator system.

11. A monitoring method according to claim 1, wherein the actuator system is a variable geometry actuator system to control parameters selected from:

positions of a bleed valve for a turbojet compressor;

a fuel flow rate;

clearances at blade tips of a high-pressure or low-pressure turbine; and pitch angles of variable-pitch compressor stator vanes.

12. A non-transitory computer readable medium including computer executable instructions for executing a monitoring method according to claim 1, when executed by a computer.

13. A monitoring device monitoring a servo-control loop of an actuator system for actuating variable geometry components of a turbojet of an aircraft, the actuator system including a servovalve controlling first and second actuators, the device comprising:

estimator means for estimating a plurality of monitoring parameters from operating data of the servo-control loop, the monitoring parameters being selected from at least one of the following parameter categories:

a category of parameters representative of positions of the actuators;

a category of parameters representative of speeds of the actuators;

a category of parameters representative of coefficients of auto-regressive models used for predicting positions of actuators as a function of a control current of the servovalve; and a category of parameters representative of the control current of the servovalve or of an integral current of the servo-control loop;

obtaining means for obtaining a plurality of indicators from the monitoring parameters;

determination means for determining at least one signature from values of at least some of the indicators; and detection and location means for detecting and locating a degradation at affecting the servo-control loop as a function of the least one determined signature, and issuing a maintenance notice in response to detection of the degradation.

14. A monitoring device according to claim 13, wherein:

the estimator means estimating monitoring parameters and the obtaining means for obtaining indicators are activated for each mission of a plurality of successive missions of the aircraft;

the estimator means is configured to estimate a monitoring parameter representative of a control current of the servovalve of the actuator system and at least one monitoring parameter representative of an actuator speed of the actuator system;

the obtaining means is configured to obtain the indicators by analyzing variations of the at least one monitoring parameter representative of an actuator speed as a function of the monitoring parameter representative of a control current;

the determination means determining the at least one signature is configured to determine the at least one signature from indicators obtained over a plurality of successive missions of the aircraft, the at least one signature being representative of variation of the indicators over the missions; and the detection means comprises means for comparing the at least one signature with at least one reference signature associated with at least one predetermined degradation that might affect the servo-control loop.

* * * * *